United States Patent [19]

Shinno et al.

[11] Patent Number: 5,032,211
[45] Date of Patent: Jul. 16, 1991

[54] DEVICE FOR CONTROLLING TENSION OF TAPE FOR USE IN AUTOMATIC TAPE AFFIXING APPARATUS

[75] Inventors: Nobuo Shinno; Yasuhiro Ohnishi, both of Osaka, Japan

[73] Assignee: Shinnippon Koki Kabushiki Kaisha, Osaka, Japan

[21] Appl. No.: 345,132

[22] Filed: Apr. 28, 1989

[30] Foreign Application Priority Data

May 7, 1988 [JP] Japan .................................. 63-110771

[51] Int. Cl.⁵ .............................................. G05B 19/10
[52] U.S. Cl. .................................... 156/361; 156/574; 242/203
[58] Field of Search ................. 156/361, 574; 242/203

[56] References Cited

U.S. PATENT DOCUMENTS

| | | | |
|---|---|---|---|
| 3,137,767 | 6/1964 | Axon et al. | 242/203 X |
| 4,363,457 | 12/1982 | Flint et al. | 242/203 |
| 4,739,950 | 4/1988 | Goker et al. | 242/203 |
| 4,799,981 | 1/1989 | Stone et al. | 156/361 X |

*Primary Examiner*—Robert L. Lindsay
*Attorney, Agent, or Firm*—Jordan and Hamburg

[57] ABSTRACT

A device for controlling the tension of a tape for use in an automatic tape affixing apparatus includes a tape affixing head movable in X axis, Y axis, Z axis, the tape affixing head carrying a tape supply reel, a tape take-up reel, a tape presser roller, and a tape positioning mechanism; a control motor for controlling the torque of each of the tape supply reel and the tape take-up-reel; a sensor for the winding radius of each of the tape supply reel and the tape take-up reel; a rotary encoder for detecting the feeding amount of the tape; control means for controlling the control motor; the control means generating a torque control signal based on a signal of the winding radius of each reel from the sensor, a signal on the position of the tape from the rotary encoder, and the feeding resistance of the tape and then sends the torque control signal to the control motor so that the tape portions before and after the tape positioning mechanism are kept at the same tension.

8 Claims, 6 Drawing Sheets

DEVICE FOR CONTROLLING TENSION OF TAPE FOR USE IN AUTOMATIC TAPE AFFIXING APPARATUS

BACKGROUND OF THE INVENTION AND RELATED ART STATEMENT

The present invention relates to a device for controlling tension of a tape for use in an automatic tape affixing apparatus for automatically affixing a tape of composite material on to the surface of an adhesion form having various contours to make a lamination of the tape.

In recent years, lightweight plate materials have been produced from a tape of composite material, i.e. a tape prepared by impregnating carbon fiber, aramid fiber or like reinforcing fiber with a thermosetting resin, by affixing the tape on the surface of an adhesion form (body) having specified contours to make a lamination, and thereafter subjecting the lamination to a curing treatment with application of heat and pressure. Japanese Unexamined Patent Application No. 58-45057, for example, discloses a known method of automatically affixing such a tape of composite material. With this method, the tape is continuously paid off from a reel and pressed against the surface (curved surface) of the adhesion form with a press roller, the press roller is moved along a predetermined path to successively affix tape portions without leaving a clearance therebetween, and the tape affixing direction is changed from layer to layer, whereby a lamination is obtained.

In the tape affixing operation, torque is applied to a tape supply reel and a tape take-up reel so that a constant tension is always applied to the tape. However, it is unavoidable that the tension of the tape is varied due to the change in the feeding direction of the tape and in the feeding speed of the tape. When the tension of the tape is varied, the tape may slip on a tape positioning mechanism including a drive roller for feeding the tape or undesirable stretches. Consequently, errors may occur in an initial affixing position or other portions.

SUMMARY OF THE INVENTION

The present invention has worked out to overcome the above-mentioned drawbacks. It is an object of the present invention to provide a device for controlling tension of tape for use in an automatic tape affixing apparatus which can maintain the tape at a constant tension and place the tape on a predetermined position, for example, on an initial affixing position, at a high accuracy.

According to the present invention, a device for controlling tension of tape for use in an automatic tape affixing apparatus includes a tape affixing head movable in X axis, Y axis, Z axis, the tape affixing head carrying a tape supply reel, a tape take-up reel, a tape presser roller, and a tape positioning mechanism; a control motor for controlling the torque of each of the tape supply reels and the tape take-up reel; a sensor for the winding radius of each of the tape supply reel and the tape take-up reel; a rotary encoder for detecting the feeding amount of the tape; control means for controlling the control motor; the control means generating a torque control signal based on a signal on the winding radius of each reel from the sensor, a signal on the position of the tape from the rotary encoder, and the feeding resistance of the tape and then sends the torque control signal to the control motor so that the tape portions before and after the tape positioning mechanism are kept at the same tension.

Accordingly, the control means generates torque control signals based on signals on the winding radius of each reel from sensors, signals on the position of the tape from the rotary encoder and the feeding resistance of the tape and then sends the torque control signal to the control motor, whereby inertia of the reel during accelerating and decelerating, the feeding resistance of the tape such as rotational resistance of the reel, the winding radius change of the reel are prevented from influencing the tension of the tape.

DETAILED DESCRIPTION OF PREFERRED EMBODIMENTS

Figure 2:
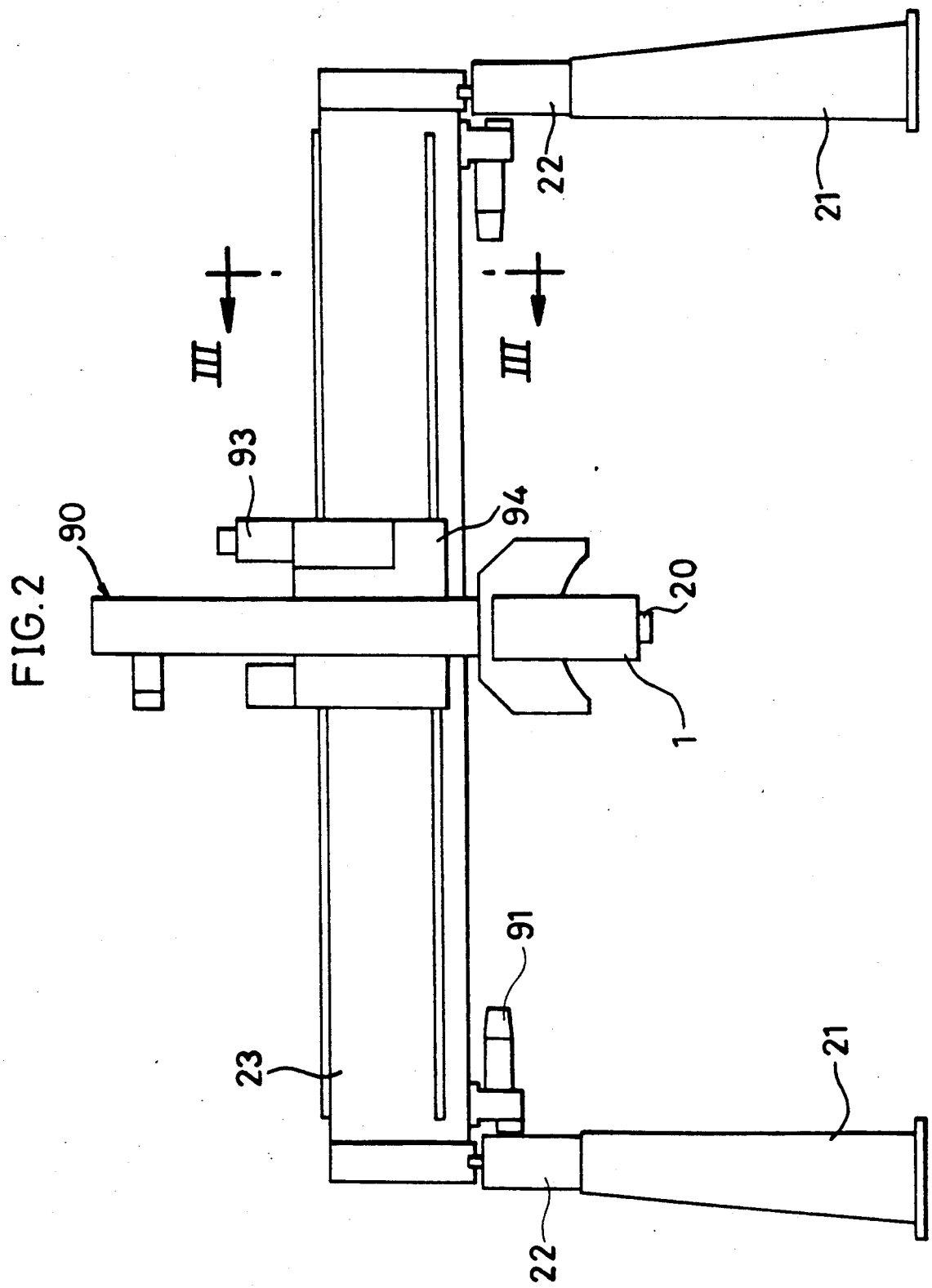
FIG. 2 is an overall schematic elevational view of an automatic tape affixing apparatus to be equipped with a device of the present invention.
Figure 3:
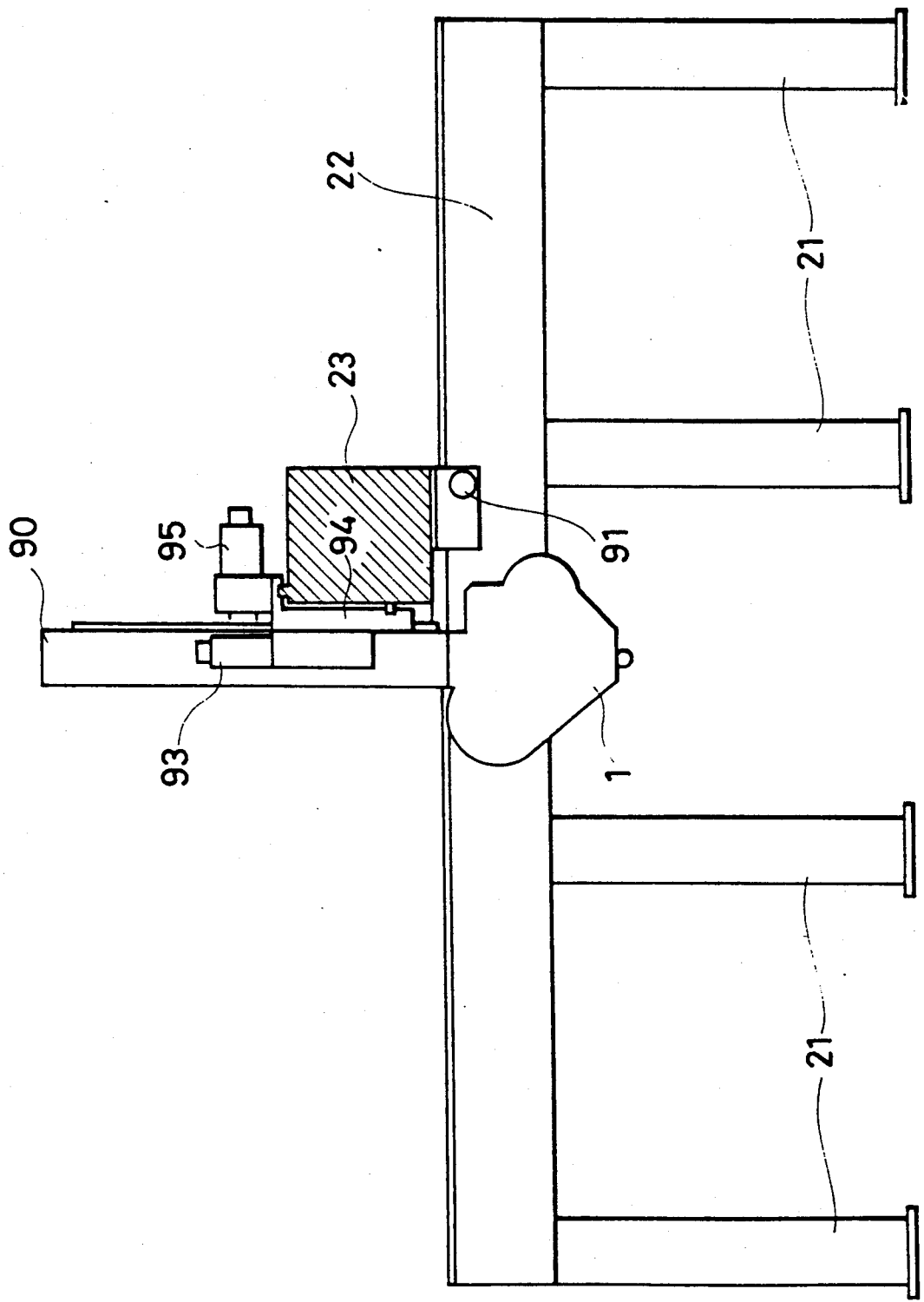
FIG. 3 is a sectional view taken along the line III—III in FIG. 2.

With reference to FIGS. 2 and 3, a pair of said rails 22 supported by columns 21 are arranged in parallel to each other. A cross rail 23 extends between and is supported by the side rails 22. The cross rail 23 is movable on the side rails 22 by an X-axis servomotor 91 in the direction of X axis (perpendicular to the plane of FIG. 2). A Y-axis saddle 94 mounted on the cross rail 23 is movable by a Y-axis servomotor 93 along the cross rail 23 in the direction of Y-axis (laterally in FIG. 2). A Z-axis saddle 90 mounted on the Y-axis saddle 94 is movable by a Z-axis servomotor 95 in the direction of Z axis (vertically).

Figure 4:
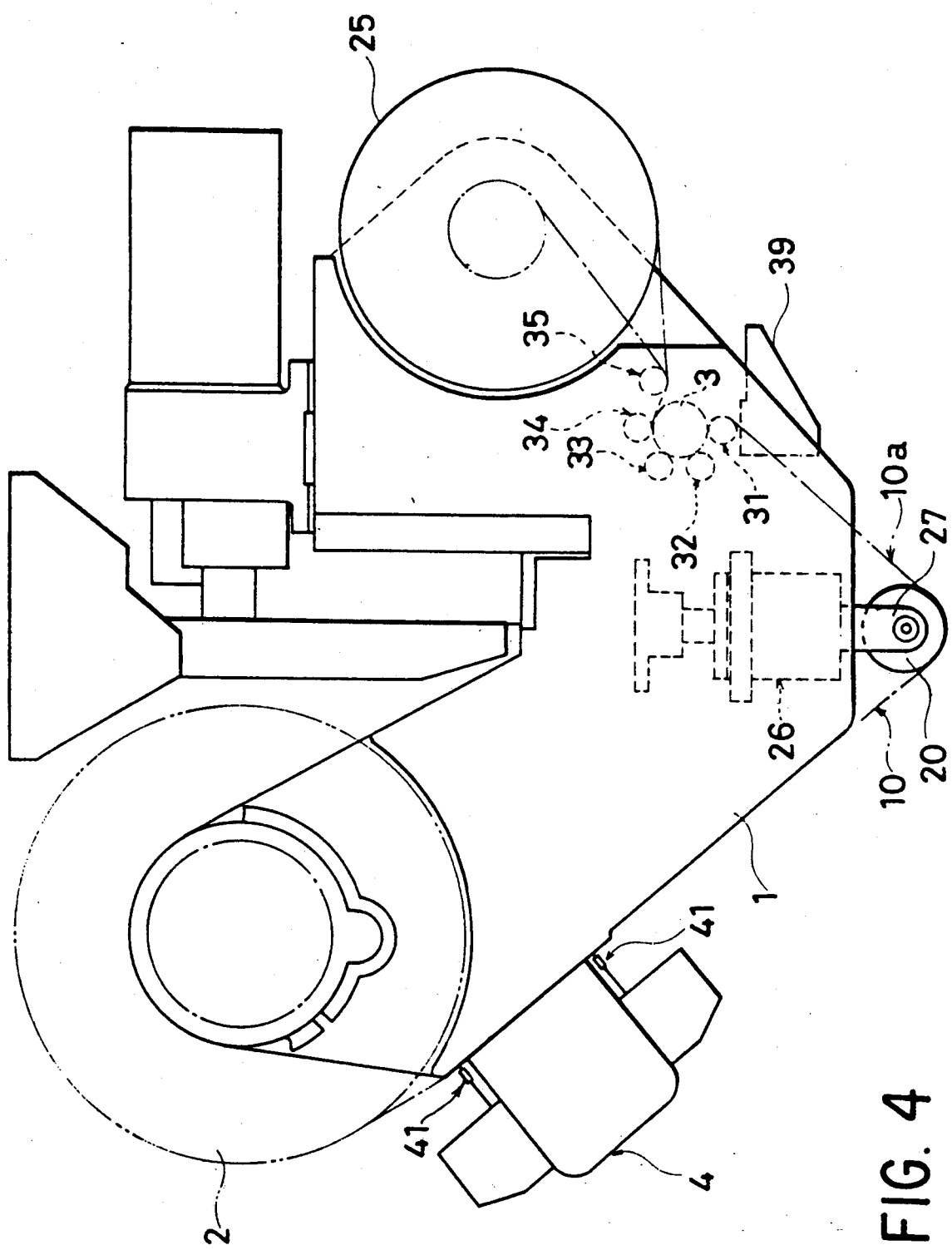
FIG. 4 is a side view showing a tape affixing head.

As shown in FIG. 4, a tape affixing head 1 is provided with a tape supply reel 2 and a take-up reel 25. The tape supply reel 2 carries a roll of double layer tape 10 consisting of composite tape and backing paper and the take-up reel 25 winds up only the backing paper. The tape 10 paid off from the tape supply reel 2 is cut with cutters 41 of a tape cutting device 4 with the backing paper being not cut. Cut-off strips of the composite tape are then pressed on an adhesion form by a presser roller 20, and the backing paper is run around a drive roller (pinch roller) 3 and then wound on the take-up reel 25. Reference numeral 39 designates a scrap tape collection box.

The presser roller 20 is held by a bracket 27 of a roller holding means 26 attached to the tape affixing head 1. A plurality of driven rollers 31, 32, 33 and 34 are disposed around the drive roller 3. These driven rollers 31, 32, 33 and 34 and the drive roller 3 constitutes a tape positioning mechanism.

The driven rollers 31, 32, 33, 34 are pressed against the drive roller 3 to hold the tape 10 therebetween. Furthermore, an auxiliary roller 35 is disposed on the tape take-out side of the drive roller 3 so as to deflect the tape 10a closer to the drive roller 3 than a tangent line at the contact point of the drive roller 3 and the last driven roller 34. Further, the last driven roller 34 is provided with a rotary encoder not shown. The rotary encoder is not attached to the drive roller 3 but to the last driven roller 34.

Figure 1:
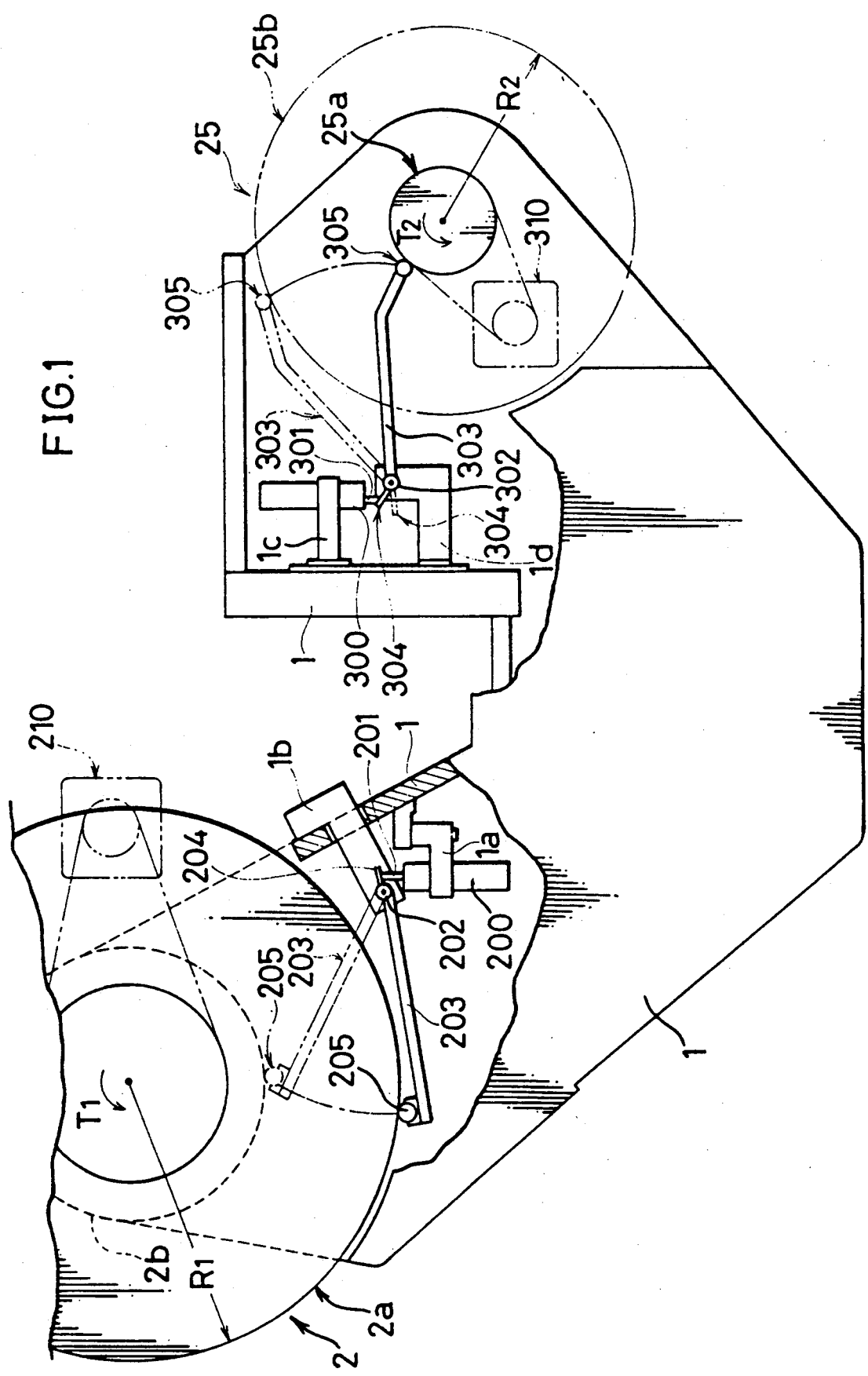
FIG. 1 is a partial sectional view illustrating means for measuring the change of tape winding radius embodying the present invention.

FIG. 1 shows a sensor mechanism for detecting the winding radius of each of the tape supply reel 2 and the tape take-up reel 25. A constant torque is applied to the tape supply reel 2 by a control motor 210. A sensor 200 is attached to the tape affixing head 1 with a bracket 1a. Also, a shaft 202 is attached to the tape affixing head 1 with a bracket 1b. A lever 203 is rotatably attached to the shaft 202. An actuating member 204 is provided on a fulcrum end of the lever 203. The actuating member 204 is made in contact with a contact member 201 of the sensor 200. The lever 203 has also a roller 205 on its free end. The roller 205 is made in contact with the peripheral surface of the tape 10 wound on the tape supply reel 2. The lever 203 is provided with a spring (not shown) for pressing the roller 205 against the peripheral surface of the tape 10.

The take-up reel 25 also has similar sensing means. A constant torque is applied to the take-up reel 25 by a control motor 310. A sensor 300 is attached to the tape affixing head 1 with a bracket 1c. Also, a shaft 302 is attached to the tape affixing head 1 with the bracket 1d, and a lever 303 is rotatably attached to the shaft 302. An actuating member 304 is provided on a fulcrum end of the lever 303. The actuating member 304 is made in contact with a contact member 301 of the sensor 300. The lever 303 has also a roller 305 on its free end. The roller 305 is made in contact with the peripheral surface of the tape 10a wound on the tape take-up reel 25. The lever 303 is provided with a spring (not shown) for pressing the roller 305 against the peripheral surface of the tape 10a.

Now, the operation of the automatic tape affixing apparatus will be described. X-axis, Y-axis and Z-axis servomotors 91, 93 and 95 are actuated to press the presser roller 20 at the forward end of the tape affixing head 1 against the adhesion form not shown and to move the tape affixing head 1 along a programmed path on the surface of the adhesion form while the tape 10 is fed from the supply reel 2 at a predetermined rate and tension, whereby the tape is affixed on the surface.

In this operation, the tape 10 is placed between the drive roller 3 and the driven rollers 31 to 34 and fed by the rotation of the drive roller 3. The tape is taken up by the take-up reel 25. On the other hand, a predetermined rotational resistance is applied to the tape supply reel 2 so that a desirable tension arises on the tape 10.

It is required that the tape 10 has the same tension before and after the tape positioning mechanism. The tension of the tape varies due to the following;

(a) inertia of the tape supply and tape take-up reels and other rollers when accelerating or decelerating the tape;

(b) feeding resistance of the tape, such as resistance in rotation of the tape supply and tape take-up reels;

(c) winding radius change of the tape of the reels.

Therefore, it is necessary to consider the above-mentioned facts for determining torque instructions to the control motors 210, 310 for controlling the tension of the tape.

First, with inertia of the reels and other rollers when accelerating or decelerating the tape the rollers on the feeding path of the tape have moment of inertia, and therefore the tension of the tape varies due to the acceleration or deceleration of the rollers. Specifically, where a value calculated based on the sum of moments of inertia before the drive roller 3, i.e., the tape supply reel side, is $K_{12}$, a value calculated based on the sum of moments of inertia after the drive roller 3, i.e., the take-up reel side, is $K_{22}$, and a positional signal generated from the rotary encoder attached to the last driven rollers is U, the acceleration $\alpha$ of the tape 10 is as follows:

$$\alpha = (d^2/dt^2)U$$

If the control motor receives a unchanged torque instruction, the tension of the tape on the supply reel side is given an increased tension $F_{14}$ which is calculated as follows:

$$F_{14} = K_{12} \cdot \alpha$$

Conversely, the tension of the tape on the take-up reel side is given a reduced tension $F_{24}$ which is calculated as follows:

$$F_{24} = K_{22} \cdot \alpha$$

Accordingly, inertia of the both reels and other rollers are required to considered in advance when a torque instruction is issued. The control motor 210 is given a torque instruction for decreasing the tension of $F_{14}(=K_{12} \cdot \alpha)$ in advance. Conversely, the control motor 310 is given a torque instruction for increasing the tension of $F_{24}(=K_{22} \cdot \alpha)$ in advance.

With feeding resistance of the tape, the tape 10 is subjected to a rotational resistance of the tape supply reel 2, a frictional resistance of a tape-cutter table and a rotational resistance of the presser roller 20 on the supply reel side and is subjected to a rotational resistance of the take-up reel 25 on the take-up reel side. The directions of these resistances follow the feeding direction of the tape. If the torque instructions to the control motors 210, 310 are kept unchanged, the tension of the tape varies following variations of the feeding direction of the tape. Accordingly, to keep the tension of the tape constant, it is necessary to change the torque instruction in accordance with the feeding direction of the tape.

Specifically, in accordance with preset feeding resistances $F_{12}$ on the tape supply reel side, and $F_{22}$ on the tape take-up reel side;

(A) on the tape supply reel side, when fed in the winding direction, the reduced tension of $F_{12}$ is given to the tape. When fed in the rewinding direction, the increased tension of $F_{12}$ is given to the tape.

(B) on the tape take-up reel side, when fed in the winding direction, the increased tension of $F_{22}$ is given to the tape. When fed in the rewinding direction, the reduced tension of $F_{22}$ is given to the tape.

The feeding direction of the tape is discriminated from plus or minus sign of the tape feeding speed v which is obtained by differentiating the tape position signal U from the rotary encoder.

With winding radius change of the tape, a standard tension of the tape 10 is produced by the control motors 210, 310 adopted for the tape supply reel 2 and the take-up reel 25 respectively. However, even if constant torques are applied to the respective reels by the control motors 210, 310, the respective winding radii of the tape supply reel 2 and the take-up reel 25 change in accordance with the feeding and taking-up of the tape 10, and consequently the tension of the tape 10 changes. Specifically, the tape winding radius $R_1$ of the tape supply reel 2 changes from the maximum winding radius 2a to the minimum winding radius 2b. On the other hand, the tape winding radius $R_2$ of the take-up reel 25 changes from the minimum winding radius 25a to the maximum winding radius 25b in accordance with the change of the tape supply reel 2. Therefore, it is necessary to prevent the winding radius change from causing a variation of the tension of the tape 10.

It could be seen that the control taking into consideration the above-mentioned facts (a), (b), and (c) makes it possible to eliminate the variation of the tape tension on the tape supply reel and tape take-up reel sides and keep the tension constant.

Figure 5A:
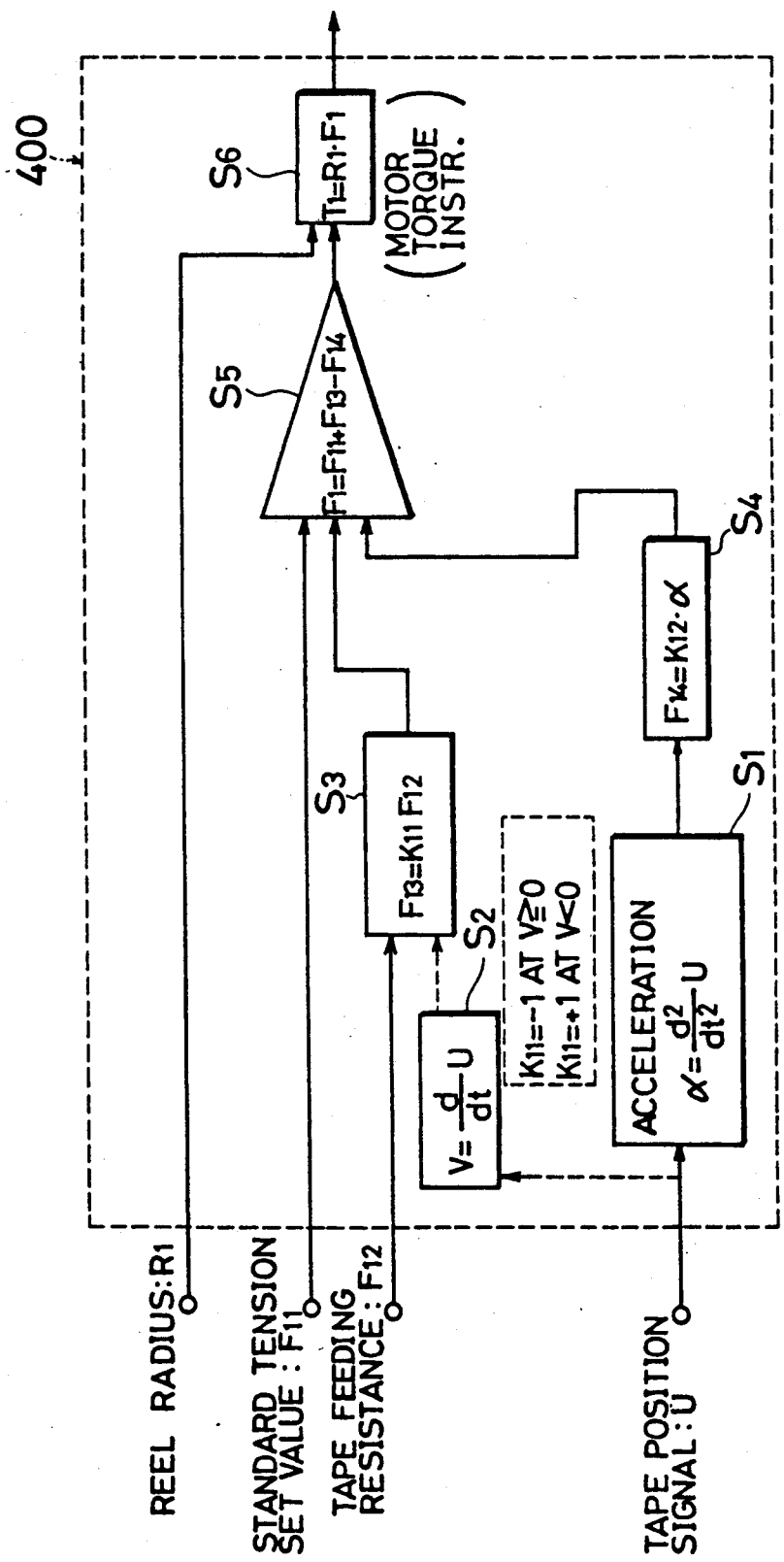
FIGS. 5A and 5B are block diagrams showing respective control means before a tape positioning mechanism and after the same.
Figure 5B:
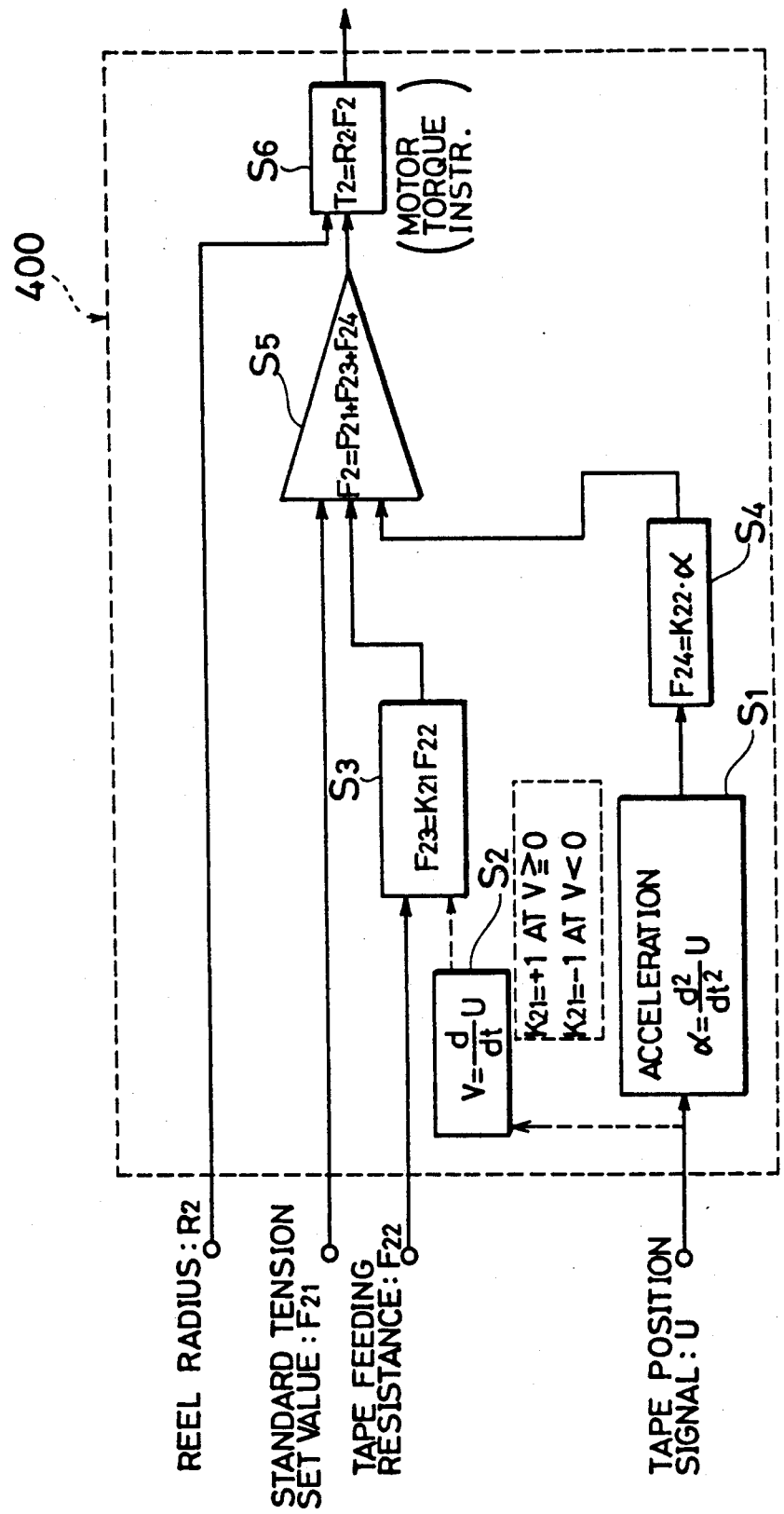

FIGS. 5A, 5B show operations of the control stated above in block diagrams. The control on the tape supply reel side performed by control means 400 will be described with reference to FIG. 5A. Initially, torque is applied to the tape supply reel 2 by the control motor 210 so that a standard tension set value $F_{11}$ arises on the tape. The tape winding radius $R_1$ of the tape supply reel 2 is always detected by the sensor 200. The detection signal is sent to the control means 400. The feeding amount of the tape 10 or tape position signal U is sent from the rotary encoder on the driven roller 34 to the control means 400. In the control means 400, the acceleration $\alpha$ is calculated based upon the tape position signal U from the rotary encoder by the following equation in Step $S_1$:

$$\alpha = (dt^2/dt^2)u$$

Further, the speed v is calculated in Step $S_2$ by the following equation:

$$v = (d/dt)U$$

In Step $S_2$, when $v \geq 0$, the coefficient $K_{11}$ representing the feeding direction of the tape is set at "$-1$", when $v < 0$, $K_{11}$ is set at "$+1$".

In Step $S_3$, the preset feeding resistance $F_{12}$ is multiplied by $K_{11}$ which is set in Step $S_2$ to provide a feeding resistance $F_{13}$ having a detected feeding direction information.

In Step $S_4$, the value $K_{12}$ obtained based on the sum of moment of inertia is multiplied by the above acceleration $\alpha$ to provide the tension increase or decrease $F_{14}$ due to the acceleration or deceleration during tape feeding.

In Step $S_5$, the feeding resistance $F_{13}$ is added to the standard tension set value $F_{11}$ and the added value $(F_{11}+F_{13})$ is then substracted by the tension increase or decrease $F_{14}$ to provide a value $F_1$. $F_1$ is multiplied by the reel radius $R_1$ in Step $S_6$ to give a torque instruction $T_1$ to the control motor 210.

FIG. 5B shows operations of the control performed on the tape take-up reel side, which are basically the same as those in FIG. 5A. In this case, torque is applied to the tape take-up reel 25 by the control motor 310 so that a standard tension set value $F_{21}$ arises on the tape. The winding radius $R_2$ of the take-up reel 25 is always detected by the sensor 300. In Step 2, when $v \geq 0$, the coefficient $K_{21}$ representing the feeding direction of the tape is set at "$+1$", and when $v < 0$, $K_{21}$ is set at "$-1$".

In Step $S_3$, the preset feeding resistance $F_{22}$ is multiplied by $K_{21}$ which is set in Step $S_2$ to provide a feeding resistance $F_{23}$ having a detected feeding direction information.

In Step $S_4$, the value $K_{22}$ obtained based on the sum of moment of inertia is multiplied by the above acceleration $\alpha$ to provide the tension increase or decrease $F_{24}$ due to the acceleration or deceleration during tape feeding.

In Step $S_5$, the above three values are $F_{21}$, $F_{23}$, $F_{24}$ are added to give a value $F_2$. $F_2$ is multiplied by the reel radius $R_2$ in Step $S_6$ to give a torque instruction $T_2$ to the control motor 210.

According to the present invention, as previously mentioned, control means generates torque control signals based on signals on the winding radius of each reel from sensors, signals on the position of the tape from a rotary encoder, and the feeding resistance of the tape due to each reel and other rollers and then sends the torque control signals to control motors so that tape portions before and after the tape positioning mechanism are kept the same tension. Accordingly, the tape can be held at a constant tension with eliminating the influence of inertia of the tape supply reel, the tape take-up reel, and other rollers, feeding resistance of the tape such as rotational resistance of the reel, tape winding radius of the reel. Thus, the tape can be positioned with high accuracy.

What is claimed is:

1. An automatic tape affixing apparatus for automatically affixing a tape on an affixing surface comprising:
   multi-axis tape head means movable in a plurality of axial directions, said tape head means carrying a tape supply reel and a tape take-up reel with said tape passing along a tape path between said supply reel and said take-up reel, said tape head means carrying a tape presser roller disposed along said tape path for pressing said tape onto said affixing surface, said tape head means further carrying tape feed positioning means disposed along said tape path for feeding and positioning said tape along said tape path;
   torque regulating means for controlling the torque of said tape supply reel and said take-up reel;
   sensor means providing sensor signals relating to the radius of said supply reel and the radius of said take-up reel;
   a rotary encoder carried by said head means and disposed along said tape path for providing encoder signals relating to the amount of feed of said tape along said tape path; and
   control means receiving said sensor signals and said encoder signals and operable to control said torque regulating means to control the torque of said supply reel and said take-up reel and provide substantially equal tension on said tape between said tape feed positioning means and said supply reel and between said tape feed positioning means and said take-up reel.

2. An automatic tape affixing apparatus according to claim 1, wherein said tape feed positioning means comprises a drive roll means, said tape passing over said drive roll means such that said tape is thereby fed and driven along said tape path by said drive roll means.

3. An automatic tape affixing apparatus according to claim 2, wherein said tape path includes an upstream portion leading to said drive roll means and disposed upstream of said drive roll means, said tape path including a downstream portion leading from said drive roll means and disposed downstream of said drive roll means, said control means being operable to provide substantially equal tension in said upstream and downstream portions.

4. An automatic tape affixing apparatus according to claim 3, wherein said drive roll means is disposed between said tape presser roller and said take-up reel.

5. An automatic tape affixing apparatus according to claim 2, wherein said drive roll means comprises a drive roll and a plurality of driven rolls disposed about said drive roll, said tape passing between said drive roll and said plurality of driven rolls.

6. An automatic tape affixing apparatus according to claim 3, wherein said control means is operable to provide a control function related to the inertia of said supply and take-up reels during acceleration and deceleration thereof to thereby provide said substantially equal tension in said upstream and downstream portions.

7. An automatic tape affixing apparatus according to claim 1, wherein said control means is operable to provide a control function related to the direction of movement of said tape along said tape path.

8. An automatic tape affixing apparatus according to claim 1, wherein said control means is operable to provide a control function related to the feeding resistance of said tape as said tape moves along said tape path.

* * * * *